No. 828,792. PATENTED AUG. 14, 1906.
G. W. WHITE.
CARPENTER'S ANGLE FINDER OR ROOF FORM.
APPLICATION FILED APR. 18, 1906.
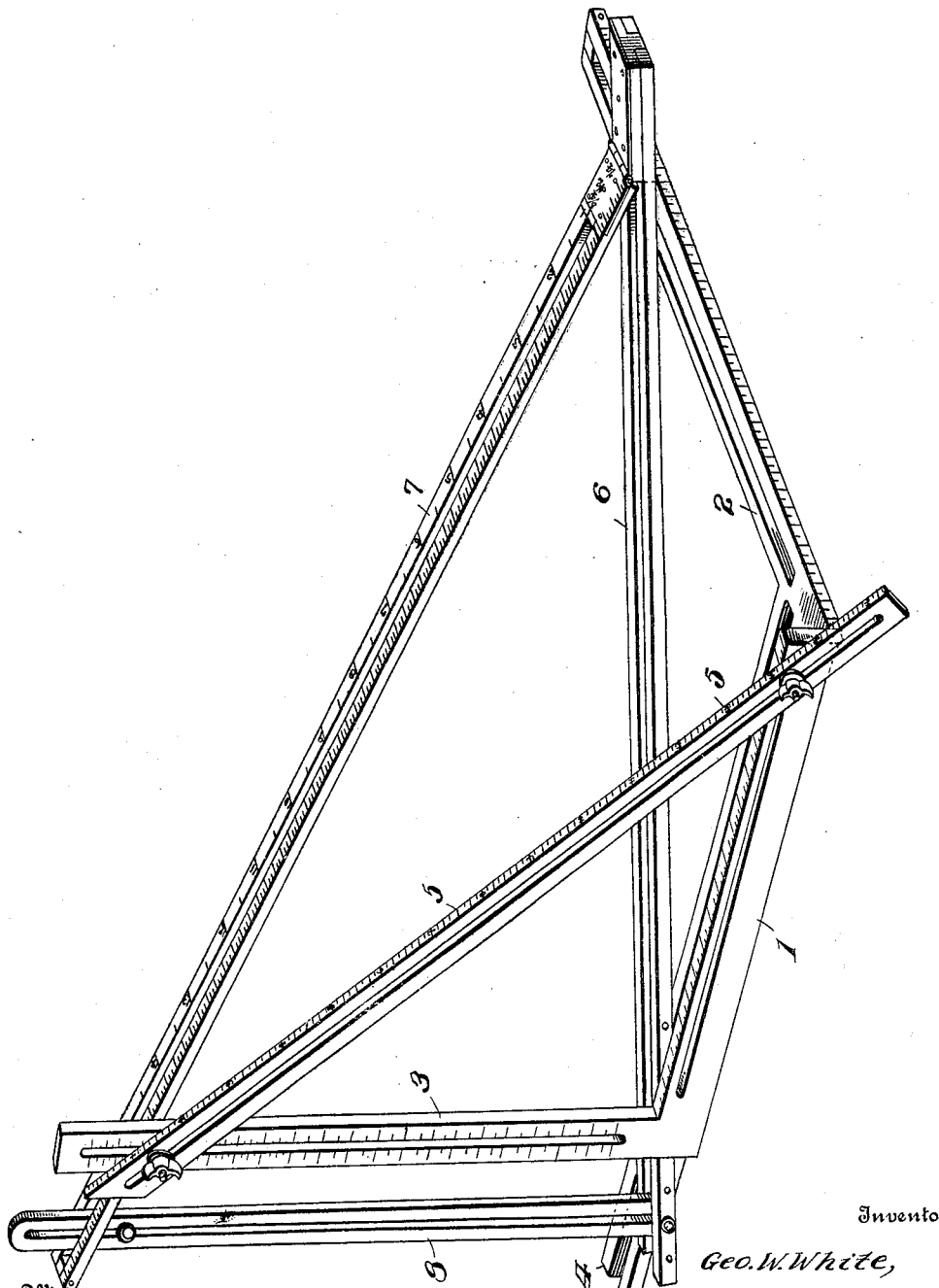
Inventor
Geo. W. White,
Witnesses
By
Attorneys

UNITED STATES PATENT OFFICE.

GEORGE W. WHITE, OF PIEDMONT, OKLAHOMA TERRITORY.

CARPENTER'S ANGLE-FINDER OR ROOF-FORM.

No. 828,792. Specification of Letters Patent. Patented Aug. 14, 1906.

Application filed April 18, 1906. Serial No. 312,482.

*To all whom it may concern:*

Be it known that I, GEORGE W. WHITE, a citizen of the United States, residing at Piedmont, in the county of Canadian, Oklahoma Territory, have invented certain new and useful Improvements in Carpenters' Angle-Finders or Roof-Forms, of which the following is a specification.

This invention has for its object to lessen the labor of carpenters, and to facilitate the laying off of the various timbers constituting the framework of a roof of the hip or valley type, and to enable the angles and bevels being ascertained with accuracy and despatch, and insuring neat joints, and obviating the waste of material from miscut.

The invention consists, essentially, of a form comprising bars which are relatively adjusted to various angular positions and which are graduated in inches and fractions thereof to enable the relative length of the timbers to be ascertained upon reference thereto.

For a full description of the invention and the merits thereof and also to acquire a knowledge of the details of construction of the means for effecting the result reference is to be had to the following description and accompanying drawings.

While the invention may be adapted to different forms and conditions by changes in the structure and minor details without departing from the spirit or essential features thereof, still the preferred embodiment is shown in the accompanying drawing, which is a perspective view of a form embodying the invention.

The device comprises angularly-disposed members 1 and 2, which in practice are designed to occupy an approximately horizontal position to correspond with the wall-plates upon which the rafters of the roof rest. The members 1 and 2 are arranged relatively at a right angle, the member 2 being horizontal and the member 1 vertical with reference to their greatest width. A vertical or altitude member 3 rises perpendicularly from one end of the member 1. A horizontal member 4 is connected or joined at one end to the member 2 and is arranged alongside of the member 1 and connected substantially or integral therewith, said member 4 being arranged with its greatest width in a horizontal plane. The members 1 and 3 form a right angle, and the members 2 and 4 likewise constitute a right angle, the former right angle being vertical, whereas the latter is horizontal, and the two right angles having a reverse arrangement. An angle member 5 constitutes the hypotenuse of the right-angled triangle 1 3 5 and has adjustable connection at its ends with the respective members 1 and 3. An angle member 6 constitutes the hypotenuse of the right-angled triangle 2 4 6 and is adjustable with reference to the members 2 and 4. The member 5 corresponds to the given rafter, its rise being determined by the altitude member 3 and its run by the distance between the outer end portions of the members 1 and 3 at the points of crossing therewith of the member 5. The member 6 determines the relative position of the lower end of the member 7, which corresponds to the hip-rafter and rests upon the members 2 and 4 to allow for rise of that part of the rafter known as the "lookout" and which projects beyond the wall-plate. The lower end of the member 7 is preferably hinged to the angle member 6, and its upper end is movable adjacent to the altitude member 3 and has adjustable connection with an upright 8, which constitutes a guide for the upper end of the member 7 and is connected at its lower end to the angle member 6.

The form besides being adjustable is adapted to be reduced to a compact form to occupy a minimum amount of space either for carrying or stowing away. The several members are graduated according to any scale, preferably in inches and fractional parts thereof, and are likewise slotted longitudinally to admit of adjustment of the fastenings by means of which the several parts are connected. When the form is properly set up and adjusted, it is a true representation of the outline of the roof structure in miniature. Hence the various angles and bevels of the timbers may be determined with accuracy by use of the bevel. The length of the several timbers may likewise be determined by having reference to the scale-graduations of the members or bars composing the form of angle-finding device. The invention is susceptible of a variety of uses and applications, which will readily suggest themselves to the skilled workman and which are obvious from the foregoing in connection with the accompanying drawing.

In the claims hereinafter appended the parts 1 and 3 are referred to as a "right angle" and the parts 1, 3, and 5 together as a "right-angled triangle." The right-angled triangle comprised by the parts 1, 3, and 5 is vertically disposed, whereas parts 2, 4, and 6 comprise a horizontally-disposed right-angled triangle. The above terms simplify the expression of the claims. However, it will be understood that said terms comprehend the members which comprise the right angles or the right-angled triangles.

Having thus described the invention, what is claimed as new is—

1. A form for carpenters' use, the same comprising reversely-disposed right angles arranged the one in an approximately horizontal position and the other in a substantially vertical position, angle members for adjustable connection with the members of the respective right angles and forming therewith right-angled triangles, and a third angle member adjustable with reference to the vertical member of one right-angle triangle and connected with the adjacent horizontal member of the other right-angled triangle.

2. A form for carpenters' use comprising reversely-disposed right-angled triangles, the one having an approximately horizontal position and the other being arranged vertically, the hypotenuse members of the right-angled triangles having adjustable connection with the respective members thereof, and an angle member 7 adjustable horizontally upon one member of the horizontal right-angled triangle and vertically adjustable with reference to the perpendicular or altitude member of the vertical right-angled triangle, the several members of the form being provided with scale-graduations to admit of readily-determining the relative lengths of timbers entering into the frame structure of a hip or like roof.

3. A form for carpenters' use comprising reversely-arranged right-angled triangles, the one occupying an approximately horizontal position and the other a vertical position, the hypotenuse members having adjustable connection with the respective members of the right-angled triangles, a guide member arranged approximately parallel with the altitude member of the vertical right-angled triangle and supported at its lower end upon the hypotenuse member of the horizontal right-angled triangle, and an angle member 7 supported at its lower end upon the horizontal hypotenuse member and having adjustable connection with the said guide member.

4. A carpenter's form substantially as specified comprising two right-angled triangles, the same having a reverse and right-angular arrangement and having their hypotenuse members adjustable with reference to the arms of the respective right-angled triangles, a guide member paralleling the altitude member of the vertical right-angled triangle and supported at its lower end upon an end of the horizontal hypotenuse, and the angle member 7 hinged at its lower end to the horizontal hypotenuse member and having its upper end adjustably connected with said guide member, the several members being longitudinally slotted and provided with scale-graduations.

In testimony whereof I affix my signature in presence of two witnesses.

GEORGE W. WHITE. [L. S.]

Witnesses:
J. W. TIMMERMAN,
JAY GERKEN.